Figures 1, 9:
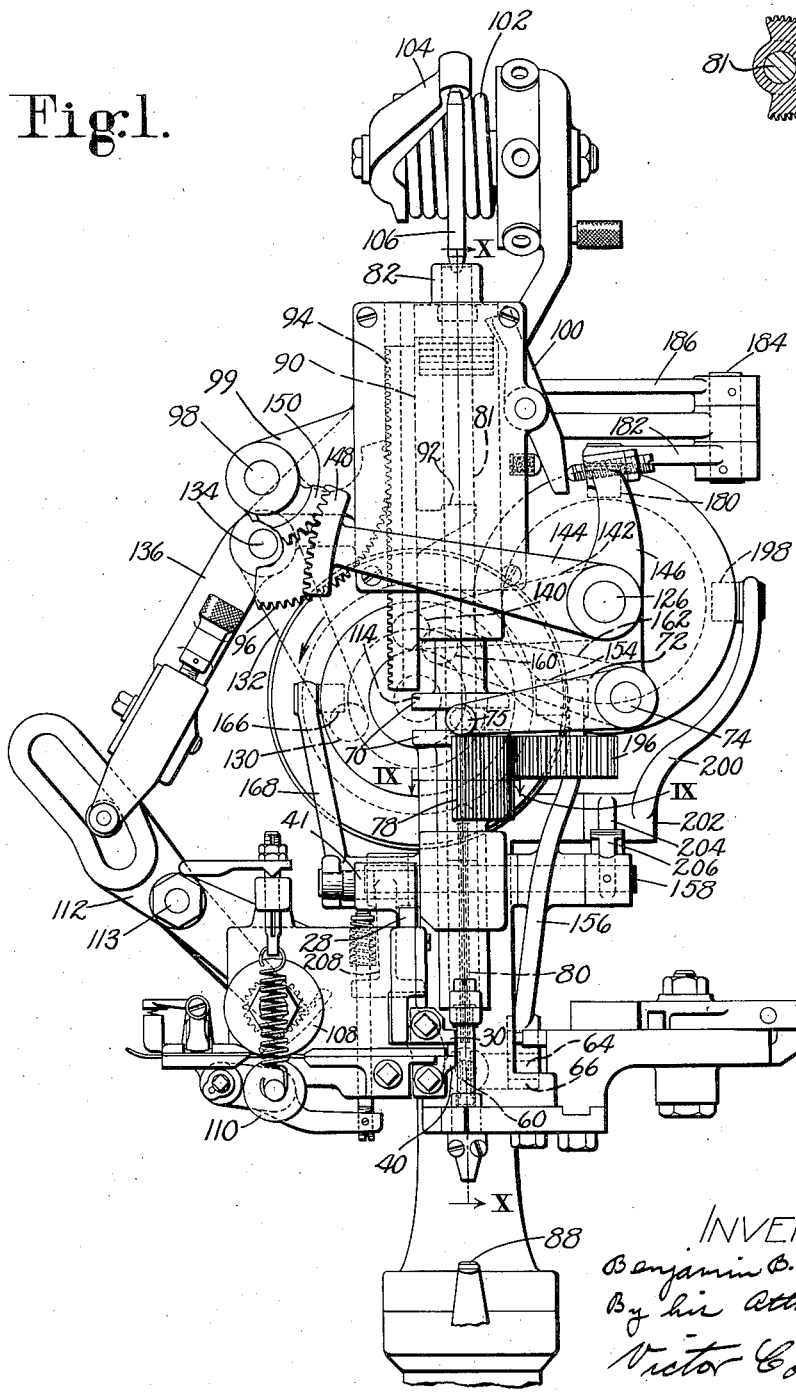

March 22, 1938.    B. B. BLANCHARD    2,111,608
STAPLING MACHINE
Filed Nov. 19, 1936    5 Sheets-Sheet 1

INVENTOR
Benjamin B. Blanchard
By his Attorney
Victor Cobb

March 22, 1938.  B. B. BLANCHARD  2,111,608
STAPLING MACHINE
Filed Nov. 19, 1936  5 Sheets-Sheet 3

INVENTOR
Benjamin B. Blanchard
By his Attorney
Victor Cobb

March 22, 1938. B. B. BLANCHARD 2,111,608
STAPLING MACHINE
Filed Nov. 19, 1936 5 Sheets-Sheet 4
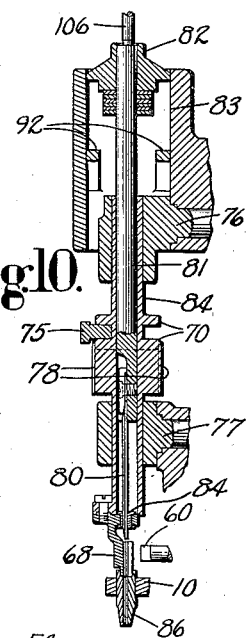
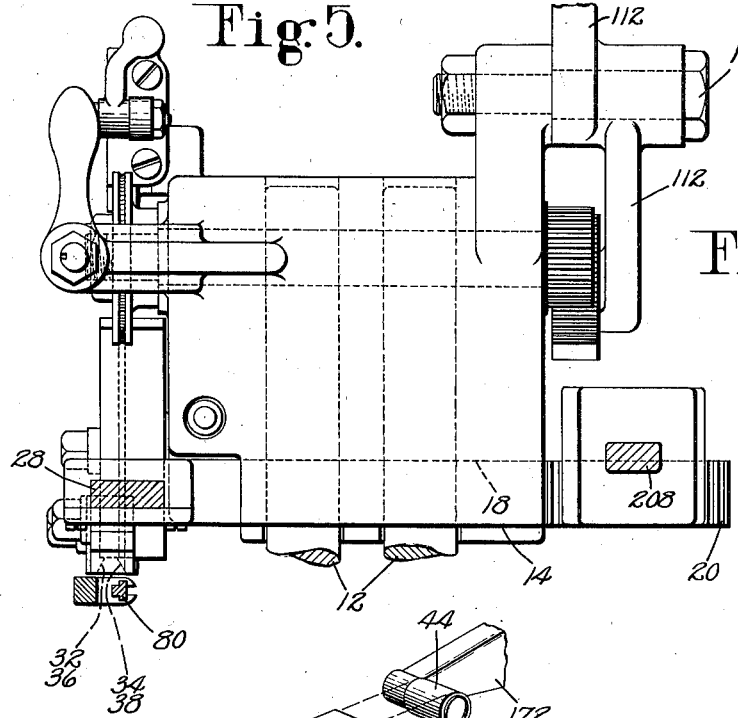
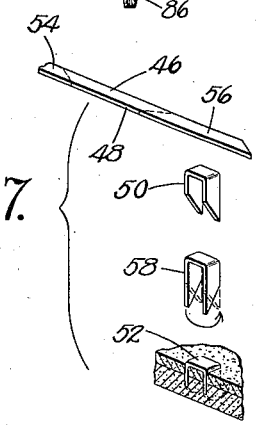
INVENTOR
Benjamin B. Blanchard
By his attorney
Victor Cobb March 22, 1938.  B. B. BLANCHARD  2,111,608
STAPLING MACHINE
Filed Nov. 19, 1936   5 Sheets-Sheet 5

Patented Mar. 22, 1938

2,111,608

UNITED STATES PATENT OFFICE 2,111,608

STAPLING MACHINE

Benjamin B. Blanchard, Swampscott, Mass., assignor to United Shoe Machinery Corporation, Paterson, N. J., a corporation of New Jersey Application November 19, 1936, Serial No. 111,667

9 Claims. (Cl. 1—20)

This invention relates to machines for cutting and forming staples from wire and driving them into a work piece. It is illustrated as embodied in a machine of the type shown in United States Letters Patent No. 1,016,930, granted February 13, 1912, on the application of W. H. Borden. Such machines comprise a feeding mechanism which feeds the end of a wire from a reel over a retractible inside former, a cutting mechanism which severs a piece of the proper length from the end of the wire, an outside former which bends this piece of wire around the inside former to form a staple, and a driving mechanism which drives the staple after the inside former has been retracted.

The cut by which the unformed staple is severed from the end of the wire, in case the wire is heavy, is often made oblique to the axis of the wire, in order to form a pointed end on each staple leg. Heretofore such cuts have been made by the same cutting edges at both ends of the unformed staple, so that its cut ends are parallel. This brings the pointed ends of the staple legs on opposite sides of the completely formed staple, which causes any drifting effect due to the beveled points to occur in opposite directions, and engenders difficulty in proper location and clinching of the staple in some classes of work.

A principal object of the present invention is to avoid these difficulties. Accordingly, I have provided a machine which will make the cuts at the ends of the unformed staple at opposite equal angles with its long axis, thus bringing the points of the legs on the same side of the staple.

Obviously, with such cuts, merely, the successive staples, as they are formed, will have their points alternately on opposite sides of the staples and consequently alternate staples would enter the work with their points on opposite sides. Accordingly, I have provided mechanism for rotating alternate staples 180° around an axis parallel to their legs, so that all the staples enter the work with the beveled surfaces of the ends of their legs facing in the same direction. These two features of the invention insure that all the staples shall be driven in exactly the same way and that both legs of each staple will be driven in the same way, thus securing uniform work.

Figure 2:
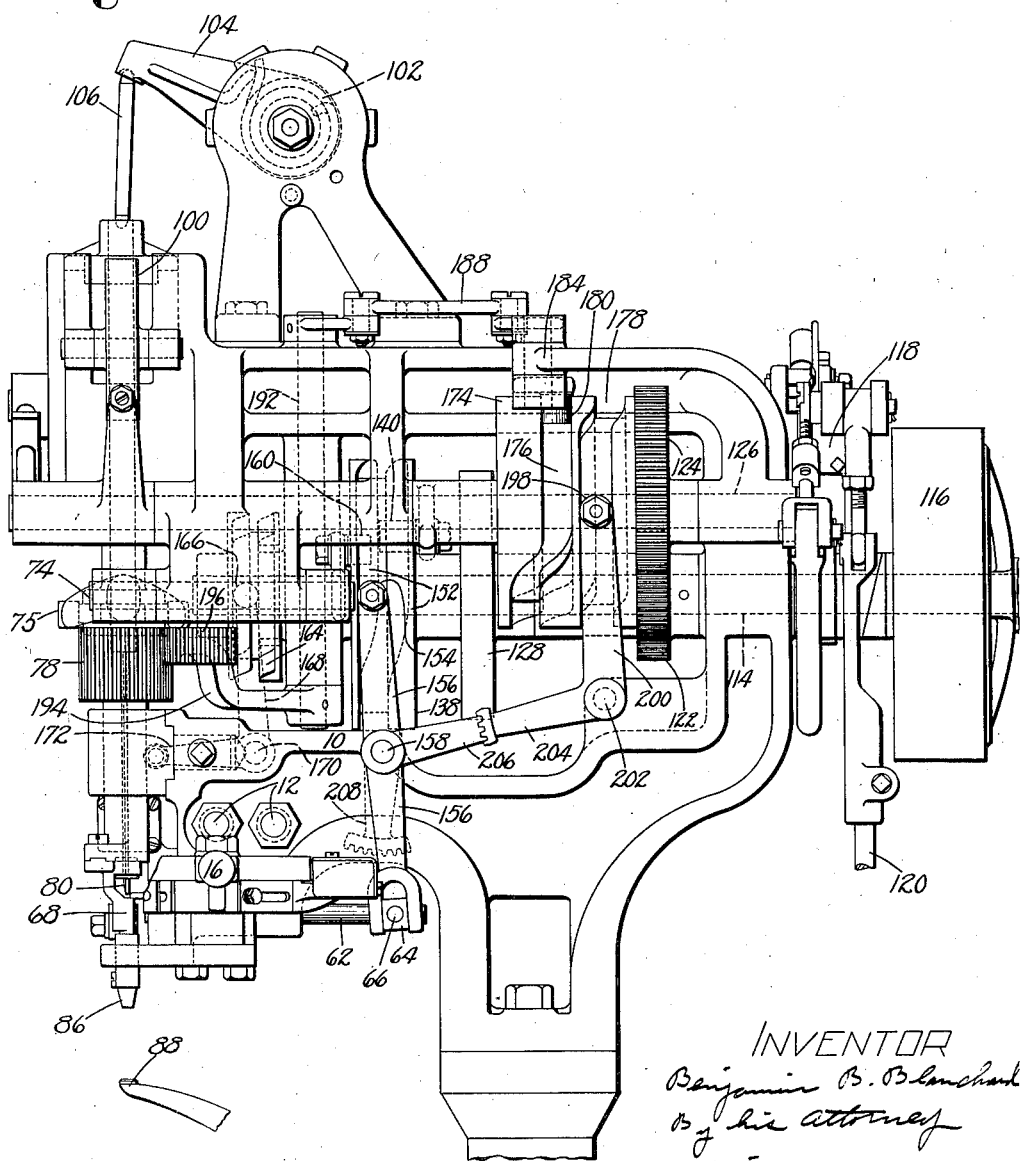
Figure 3:
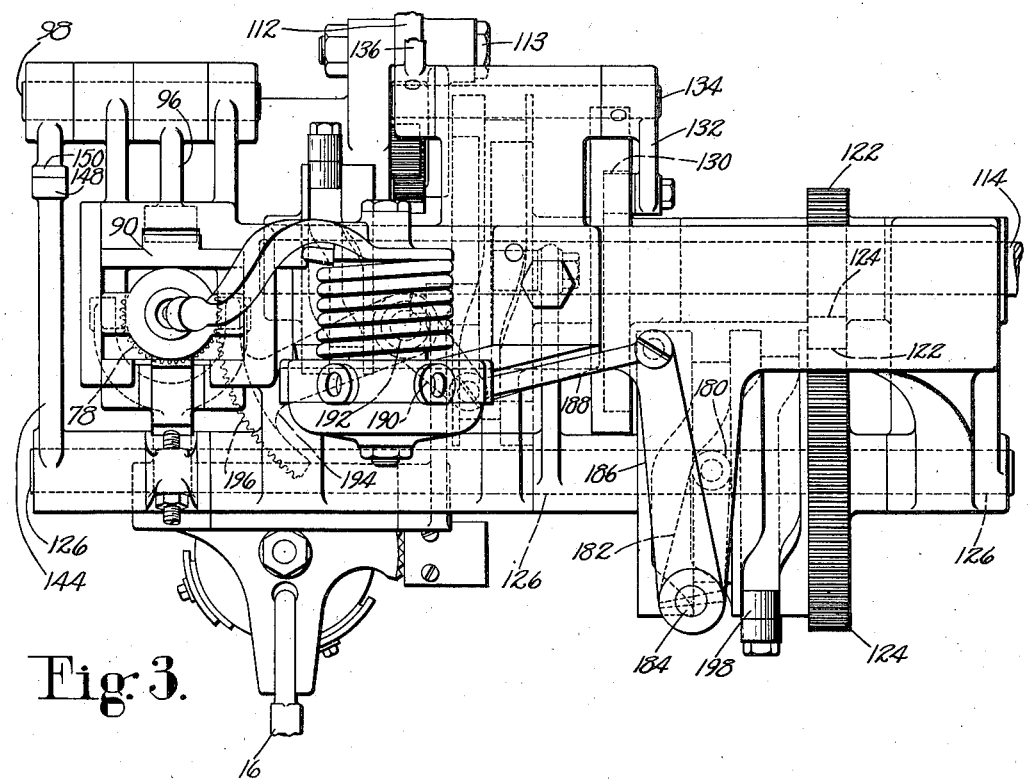
Figure 4:
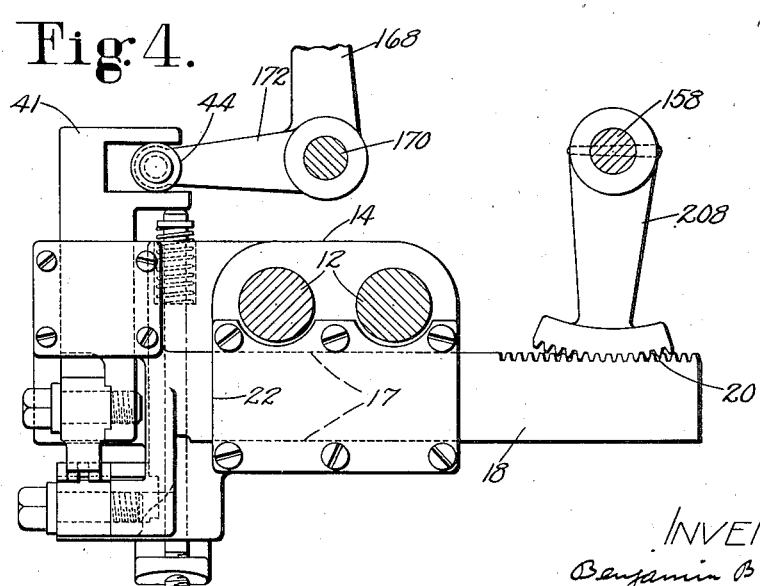
Figure 8:
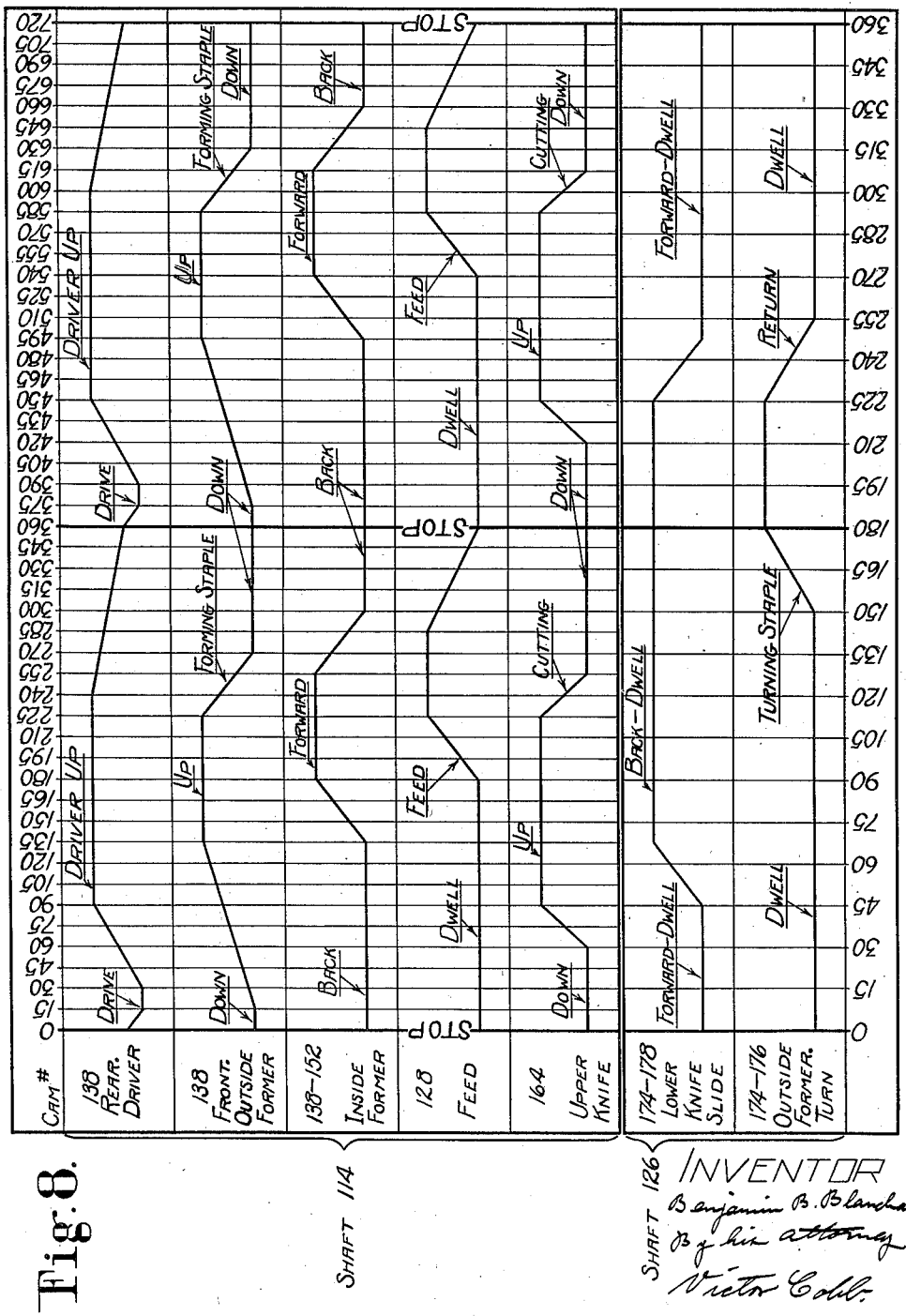

These and other features of the invention comprising certain combinations and arrangements of parts will be apparent from the following description of a preferred embodiment of the invention shown in the drawings, in which Fig. 1 is a front elevation of the machine;
Fig. 2 is a side elevation;
Fig. 3 is a plan view;
Fig. 4 is a side elevation of the lower part of the machine;
Fig. 5 is a plan of the mechanism shown in Fig. 4;
Fig. 6 is an exploded view of the cutting mechanism;
Fig. 7 illustrates a succession of staples as formed and driven by the machine;
Fig. 8 is a chart illustrating the timing of the cams;
Fig. 9 is a section on the line IX—IX of Fig. 1; and
Fig. 10 is a section on the line X—X of Fig. 1.

In the illustrated machine the lower part of the main frame 10 carries two horizontal cylindrical guide bars 12 (Figs. 2, 4 and 5) on which a carriage 14, for the cutting mechanism, is adjustable laterally of the machine by a cam lever 16. The purpose of this construction, which is fully explained in the Borden patent cited, is to move the cutting mechanism in correspondence with any adjustment in the feeding mechanism, in order to keep the legs of the staple of equal length, however that length may be varied by the adjustment of the feed.

The carriage 14 has a horizontal guideway 17 in which is mounted a slide bar 18 with a rack 20 at its rear end (Figs. 4, 5 and 6). The slideway is closed by a plate 22. At its front end the bar 18 carries a vertical slideway 24 (Fig. 6) closed by a plate 26, in which a slide bar 28 is vertically reciprocable. The lower end of the bar 28 carries a knife block 30 having two cutting edges 32, 34, cooperating with two cutting edges 36, 38 on a block 40 fastened to the bar 18 below the slideway 24. Adjustment of the bar 18 in or out in its slideway thus permits the paired cutting edges 32 and 36, or 34 and 38 to act on the wire fed between them. These pairs of cutting edges are formed on equal opposite oblique angles with the long axis of the wire, as indicated in Fig. 6 at A, so that they will form cuts at opposite bevels at the two ends of an unformed staple if the bar 18 is shifted in its guideway 17 after each cut made by the knives. All of the mechanism shown in Fig. 6 is shifted laterally (Fig. 1) by the cam lever 16 and the cutting blocks 30 and 40 are shifted forward and backward by the bar 18. The slide 28 has a head 41 at its upper end with a slot 42 in it, through which a roll 44 (Fig. 2) moves the slide 28 vertically. The slot 42 is of ample extent in both horizontal directions to embrace the roll 44 in any position of the slide 28.

The mechanism so far described will make a series of cuts in a wire 46 such as are shown in Fig. 7, thus cutting staples which will have both points on the same side, but the side on which the points appear will alternate in successive staples (48, 50, 52 and 54, 56, 58). In order that the staples may all be driven into the work in the same way, it is necessary to rotate alternate staples through an angle of 180°, as shown in Fig. 7, where the staples 48, 50, 52 are driven into the work in the orientation in which they are formed, while the staples 54, 56, 58 will be rotated as indicated in connection with the staple 58, by the mechanism now to be described.

The inside former 60 (Fig. 1) is mounted on the front end of a bar 62 (Fig. 2) which has a block 64 pivoted on a pin 66 at its rear end, by which it may be advanced and retracted.

The outside former 68 is of ordinary formation at its lower or forming end and has a grooved collar 70 at its middle portion by which it is moved up and down by a yoke-shaped lever 72 pivoted at 74 on the frame 10 and having two pins 75 which enter the opposite sides of the grooved collar 70. The cylindrical outer surface of the former is vertically and rotatably movable in bearings 76, 77 in the frame 10. The outside former 68 is rotatable by a toothed segment 78 fixed on it, to turn the formed staple as described above.

The driver 80 is clamped to a cylindrical bar 81 fitting in the outside former 68 and having a sliding head 82 moving vertically in a guide 83 (Fig. 10) in the upper part of the frame 10, as is customary, and is guided at its lower end in a throat block 84 which is mounted in the outside former 68 to permit rotation of the former 68 upon it, but is not itself rotatable. The driving throat 86 is fixed on the frame 10 and the anvil is shown at 88 (Fig. 2). The driver slide 82 is lifted by a slide 90 (Fig. 1) having abutments 92 which engage under the slide 82. The slide 90 has a rack 94 on it cooperating with a segment 96 on a shaft 98, mounted in a frame bracket 99, by which it is operated. The driver slide 82 is latched in its uppermost position by a spring-biased latch 100 which holds it in position against the pressure of a driver spring 102 which acts through a lever 104 and rod 106 to throw the driver down when the latch 100 is released.

The wire feeding mechanism is of ordinary construction and comprises a feed wheel 108 and pressure wheel 110, the former of which is operated by a lever 112 pivoted at 113 and corresponding to lever 100 in the Borden patent cited, to which reference may be made for a complete description of the mechanism. Reference may also be made to United States Letters Patent No. 1,839,238, granted January 5, 1932, on the application of F. L. MacKenzie, some details of which are closer to those of the instant machine than are those of Borden.

The mechanism for driving all these operating mechanisms will now be described (see Fig. 2). The main shaft 114 is driven by a pulley 116 through a clutch 118 controlled by a treadle rod 120. The clutch is preferably arranged to drive continuously as long as the treadle is held down, but to be released and to stop the machine at the end of that cycle upon the release of the treadle. The shaft 114 carries a pinion 122 meshing with a pinion 124 of twice the diameter of the pinion 122, mounted on a shaft 126. The shaft 126 thus makes one revolution to every two revolutions of the shaft 114.

The shaft 114 drives all the mechanism that operates alike on all the staples. It carries a cam disk 128 the cam surface of which cooperates with a roll 130 (Fig. 1) to operate a bell crank 132, 134, 136 which operates the wire feed lever 112. The shaft 114 also carries a cam disk 138 which has cam slots in both its side faces and on its edge. The slot on its rear face (Fig. 2) cooperates with a roll 140 on a three-armed bell crank 142, 144, 146 pivoted on the shaft 126. The arm 144 has a toothed segment 148, cooperating with a segment 150 on the shaft 98, to operate the slide 94 and raise the driver to latched position when the lever turns clockwise. The arm 146 kicks off the latch 100 when the lever 142, 144, 146 is turned counterclockwise. The cam 152 on the edge of the disk 138 (Fig. 2) cooperates with a roll 154 on a lever 156 (Figs. 1 and 2) pivoted at 158 to operate the block 64, pin 66 and inside former bar 62. The cam slot on the front of the disk 138 cooperates with a roll 160 on a bell-crank lever 162, 74, 72 to raise and lower the outside former.

The shaft 114 carries a third cam disk 164 with a cam slot in its edge cooperating with a roll 166 (Fig. 2) on a bell-crank lever 168, 170, 172, the arm 172 carrying the roll 44 (Figs. 4 and 6) which operates the upper cutter block 30.

The shaft 126 operates those mechanisms which have to do with the interchange of the cutting edges and the rotation of alternate staples. It carries a cam disk 174 (Fig. 2) with cam tracks 176, 178 in its periphery. The cam track 176 cooperates with a roll 180 (Fig. 2) on a bell-crank lever 182, 184, 186 (Fig. 3), the arm 186 being linked at 188 to a crank arm 190 on a vertical shaft 192 which has a crank arm 194 on its lower end. The arm 194 carries a toothed segment 196 which rotates the segment 78 and the outside former, thus turning the formed staple 180° after the inside former is retracted. The cam track 178 cooperates with a roll 198 on a bell-crank lever 200, 202, 204, the end of the arm 204 having toothed engagement with the end of an arm 206 of the bell-crank lever 206, 158, 208 which operates the knife slide bar 18 (Fig. 4).

The cam timing chart in Fig. 8 will be clear without description. The machine starts with a staple already formed and ready to drive and stops with a staple already formed, rotated if necessary, and ready to drive. The showing of Fig. 8 is illustrative, merely, and is not to be understood as limiting. Various schemes for timing the parts are possible.

Having described my invention, what I claim as new and desire to secure by Letters Patent of the United States is:

1. In a staple forming and driving mechanism, wire feeding means, staple forming and driving means, and staple cutting means having two cutting instrumentalities constructed and arranged to cut the fed wire on lines symmetrically oblique to the axis of the wire, and mechanism for bringing said two cutting instrumentalities alternately into operative relation to the fed wire whereby the points of a severed unformed staple will be on the same side thereof.

2. In a staple forming machine, wire feeding mechanism and wire cutting mechanism comprising two pairs of cooperating cutting edges positioned symmetrically obliquely to the axis of the fed wire, and mechanism arranged to displace said pairs in a direction transverse to the wire and to the direction of their relative movement in cutting the wire, to render the said pairs alternately operative to cut the wire, whereby the cuts made on the opposite ends of a severed unformed staple will be at opposite angles to its longitudinal axis.

3. In a staple forming machine, wire feeding mechanism, wire cutting mechanism comprising a pair of cutter blocks each block having two cutting edges each cooperating with a cutting edge of the other, a slide carrying both blocks and having provision for relative movement of the blocks to cut the wire when fed between them, the direction of movement of the slide being transverse to both the axis of the wire and the direction of the said cutting movement, and mechanism for operating said slide between two fixed positions to bring the two sets of cooperating cutting edges alternately into action on the wire, whereby the cuts made at opposite ends of a severed unformed staple will be on the same side of the staple.

4. In a staple forming machine, wire feeding mechanism, wire cutting mechanism comprising a pair of cutter blocks each block having two cutting edges each cooperating with a cutting edge of the other, a slide carrying both blocks and having provision for relative movement of the blocks to cut the wire when fed between them, the direction of movement of the slide being transverse to both the axis of the wire and the direction of the said cutting movement, mechanism for operating said slide between two fixed positions to bring the two sets of cooperating cutting edges alternately into action on the wire, whereby the cuts made at opposite ends of a severed unformed staple will be on the same side of the staple, and means for moving said cutter blocks toward and from each other comprising a second slide mounted on and operating transversely to said first-named slide and having a slot extending parallel to said first-named slide, and a cam-operated member engaging said slot to move said second slide.

5. In a staple forming machine, a slide, a cutter block mounted on the slide and having two cutting edges arranged in V-form, the axis of the V being perpendicular to the direction of movement of the slide, a second slide mounted on the first-named slide and carrying a second cutter block with two cutting edges arranged to cooperate with those on the first-named cutter block to sever a wire fed between the blocks, mechanism for intermittently feeding a wire between the blocks in a direction parallel to the axis of the said V, mechanism for moving the first-named slide alternately in opposite directions in timed relation to the movements of the second slide, to bring the said pairs of cooperating cutting edges alternately into cutting relation to the wire, whereby the beveled cuts formed at the opposite ends of a severed unformed staple will be on the same side thereof.

6. In a staple forming and driving machine, wire feeding means, staple cutting means, a retractible inside former over which the wire is fed before being cut, an outside former cooperating with the inside former to form a staple and to hold it after the inside former has been withdrawn, and mechanism for rotating the outside former with the formed staple 180° about an axis lying between and parallel to the staple legs before the staple is driven.

7. In a staple forming and driving machine, wire feeding and cutting means, staple forming means, staple driving means, and mechanism for rotating a formed staple through an angle of 180° about the axis of drive, after it has been formed and before it is driven.

8. In a staple forming and driving machine, wire supplying means, wire cutting means, staple forming means and staple driving means, and mechanism operated in timed relation to said means for rotating alternate staples about an axis parallel to the staple legs through an angle of substantially 180°, after each said alternate staple is formed and before it is driven, the remaining staples being driven by the driving means without having undergone said rotation.

9. In a staple forming and driving machine, wire feeding means, wire cutting means, staple forming means and staple driving means, and a cam shaft carrying cams for operating them in timed relation to one another, said wire cutting means having two cutting instrumentalities arranged to cut the fed wire on different angles equally and symmetrically oblique to the axis of said wire, mechanism for causing said instrumentalities to operate alternately on the wire to form both points of the legs of each staple on the same side of that staple, mechanism for rotating alternate staples through an angle of substantially 180° about an axis substantially parallel to the staple legs, after each said staple has been formed and before it is driven, and a cam shaft rotating at half the angular velocity of said first-named cam shaft for operating the last two said mechanisms.

BENJAMIN B. BLANCHARD.